United States Patent [19]

Shatto, Jr.

[11] Patent Number: 4,669,915
[45] Date of Patent: Jun. 2, 1987

[54] MANIPULATOR APPARATUS WITH FLEXIBLE MEMBRANE FOR GRIPPING SUBMERGED OBJECTS

[75] Inventor: Howard L. Shatto, Jr., Houston, Tex.

[73] Assignee: Shell Offshore Inc., Houston, Tex.

[21] Appl. No.: 799,679

[22] Filed: Nov. 19, 1985

[51] Int. Cl.⁴ .............................................. B63C 11/00
[52] U.S. Cl. ................................. 405/191; 248/205.8; 248/362; 114/312; 114/250; 294/64.3; 414/744 B; 901/40; 166/356
[58] Field of Search .................. 405/12, 13, 188, 190, 405/191, 224; 248/205.8, 205.9, 362, 363; 114/312, 330, 249, 250, 296; 294/64.1, 64.3; 414/737, 744 B, 752; 901/40

[56] References Cited

U.S. PATENT DOCUMENTS

| | | | |
|---|---|---|---|
| 3,165,899 | 1/1965 | Shatto, Jr. ......................... | 248/363 |
| 3,406,837 | 10/1968 | Kirsch et al. .................... | 414/744 B |
| 3,720,433 | 3/1973 | Rosfelder ......................... | 294/65.5 |
| 3,766,742 | 10/1973 | Smith et al. ....................... | 405/188 |
| 3,910,620 | 10/1975 | Sperry ................................ | 294/64.1 |
| 3,912,317 | 10/1975 | Ohnaka .............................. | 901/40 |
| 4,294,424 | 10/1981 | Tessier .............................. | 248/362 |
| 4,627,785 | 12/1986 | Monforte ........................... | 901/40 |

Primary Examiner—Cornelius J. Husar
Assistant Examiner—Kristina I. Hall

[57] ABSTRACT

A manipulator apparatus carried by a remotely operated vehicle is provided with a suction device having a flexible membrane wall capable of gripping underwater objects. The suction portion of the manipulator apparatus utilizes expansion chambers isolated from the body of water in combination with the flexible membrane wall which when expanded outward contacts and forms a suction cavity between the manipulator object and the object to be manipulated.

10 Claims, 8 Drawing Figures

FIG.7
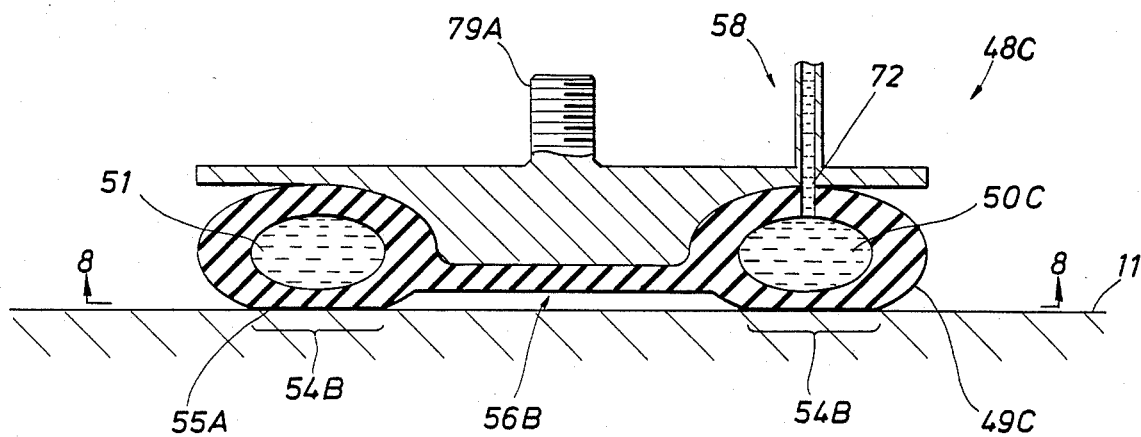
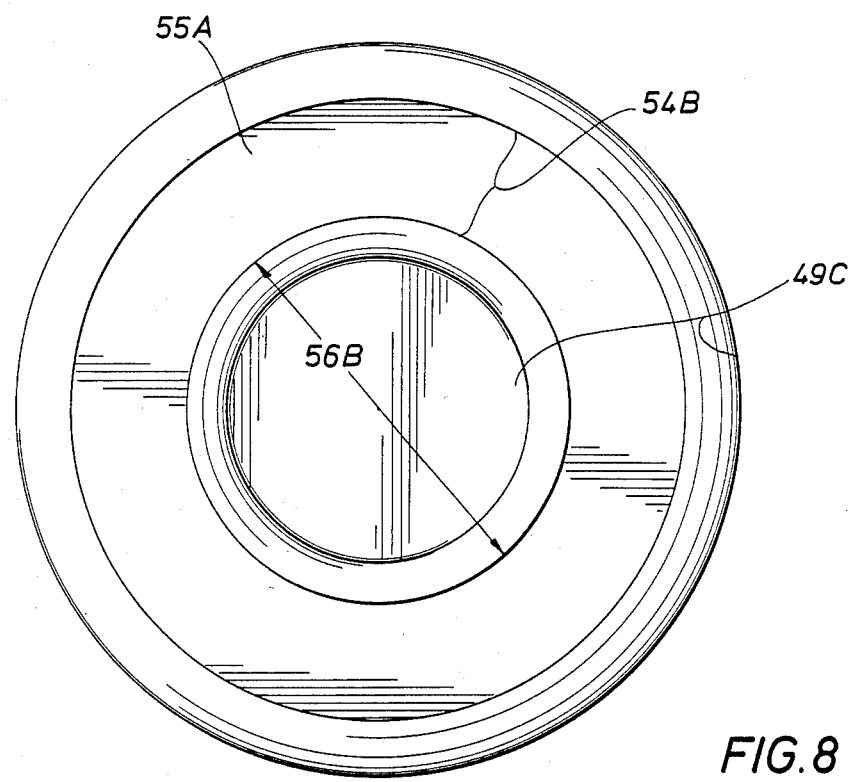
FIG.8

MANIPULATOR APPARATUS WITH FLEXIBLE MEMBRANE FOR GRIPPING SUBMERGED OBJECTS

RELATED APPLICATION

This invention is related to application Ser. No. 799,682 Filed Nov. 19, 1985, by Howard Lawton Shatto, Jr. entitled "Manipulator Apparatus for Gripping Submerged Objects."

BACKGROUND OF THE INVENTION

1. Field of the Invention

This invention relates to an apparatus for carrying out operations at underwater installations and pertains more particularly to an apparatus for manipulating equipment in the vicinity of, or which components are located on, an underwater installation, such for example as an underwater wellhead, an underwater oil and gas production facility, storage facilities, etc.

2. Description of the Prior Art

A recent development at offshore locations is the installation of large amounts of equipment underwater used in the production of oil fields and gas fields situated many miles from shore. Many wells are being built in water depths up to 6,000 feet deep, a depth greater than divers can safely work. Thus, in drilling wells, producing wells, installing underwater equipment on the ocean floor, and carrying out workover operations underwater at any of the various ocean floor installations, use has been made of what is known as a manipulator apparatus for gripping submerged objects such as the particular pieces forming the underwater equipment.

Consideration has been given to the use of magnets or electromagnets carried by such a manipulator apparatus by which the manipulator apparatus could be secured to an underwater installation during the time it is carrying out a particular operation thereon. However, in order to combat seawater corrosion, there has been a tendency to make more of the underwater equipment of stainless steel on which electromagnets cannot be used to mount a magnetic manipulator apparatus.

Such gripping devices as set forth in U.S. Pat. No. 3,165,899 issued Jan. 19, 1965, to H. L. Shatto, Jr., and as set forth in U.S. Pat. No. 3,720,433 issued Mar. 13, 1973, to A. M. Rosfelder, disclose apparatus which use suction cups which attach to the underwater object to be manipulated. The suction cups disclosed however, in both of these patents have their suction cavities open to the body of water in which the underwater objects are located. Suction applied through each cup loosens foreign material under the cup and causes the loosened material to be drawn upwards into the pumping system that generates suction at the face of each cup. Such an open suction cup design also requires continuous use of pumping power to compensate for leakage around each suction cup that contacts the underwater object. Additionally, cups which do not contact the underwater object continuously draw in additional sea water which decreases the overall suction gripping force of the entire apparatus.

An apparatus need be disclosed, therefore, that does not require a continuous pumping action upon the face of the suction cups in order to maintain a suction grip upon the underwater object. Such an apparatus should also not ingest within the pumping equipment any foreign material loosened by the suction cup. Such an apparatus should also have a means for sealing off suction cups which are not in contact with the underwater object by means of a device more reliable and more simple than the needle valve arrangement shown, for example, in FIG. 8 of U.S. Pat. No. 3,720.

SUMMARY OF THE INVENTION

The present invention comprises in simplest terms a suction member which is placed against an object being manipulated underwater. A flexible membrane wall located on the bottom of the suction member is expanded outward by the introduction of fluid within an expansion chamber defined within the suction member. The flexible membrane wall contacts the object to be manipulated in such a manner to seal and thereafter form a suction cavity beneath the suction member. Further expansion of the flexible membrane wall forces the suction body member away from the object and thereafter increases the size of the suction cavity beneath the suction member. The suction cavity now is capable of exerting a gripping force on the object to be manipulated. A suction force is thereby generated not by removal of fluid from a typical suction cup device but by the introduction of fluid into an expansion chamber located in fluid communication with an outwardly extendable flexible membrane wall.

Several advantages become apparent in this design. Fluid need only be supplied once to the suction member for the member to operate properly, a result different than the standard suction cup design that requires the continuous evacuation of fluid from a suction cup placed against the object. A continuous source of pumping power therefore need not be required to maintain the suction cavity beneath the suction member.

It is also apparent that this apparatus does not ingest any foreign material loosened by the suction member within the pumping equipment which supplies fluid to the suction member to establish the suction cavity. The flexible membrane wall in this case forms an impenetratable barrier to any fluid located outside the normal pumping system. It is also apparent that such an apparatus, if used in an array of other suction members will not require a continuous supply of pressurized fluid if the suction member does not contact an object, because the flexible membrane wall forms an effective seal with the suction member, even when pressurized.

The most important advantage, however, can be realized after studying the suction limitations of a normally open-faced suction cup as disclosed in the two previous patents. The suction cup(s) so disclosed are flat across their open faces and therefore adhere most readily to a flat surface. They may become inoperative when they are applied against a surface having more than the gentlest contours.

Study of the apparatus of the present invention, however, discloses that the present apparatus is capable of adhering to any contoured surface. The flexible membrane wall may be shaped advantageously by the suction member such that the bottom of each suction member may adhere easily to an object of any shape.

It is therefore an object of the present invention to provide a remotely operated vehicle with suitable connector means for securing it to any relatively smooth underwater installation whether made of magnetic or non-magnetic materials. A further object of the present invention is to provide a manipulator apparatus for use on component parts of underwater installations, which parts are so large or smooth that it is impossible to guage them by mechanical gripping devices such as a claw arm, hook, etc.

A feature of the present invention is to provide a manipulator apparatus comprising at least one suction member which is operatively engageable to a remotely operated vehicle or which may be used by divers to manipulate submerged objects. The suction member has a rubber-like flexible membrane wall and at least one expansion chamber containing fluid defined in the interior of the suction member. The flexible membrane wall forms at least a portion of the sides of the expansion chamber. The membrane wall may be expanded outward by the addition of fluid to the expansion chamber a sufficient distance to contact and form a seal having a sealing surface with the object to be manipulated, whereby at least one suction cavity capable of exerting a suction grip on the object is defined between the suction member and the object.

Another feature of the present invention is to provide a manipulator apparatus having in combination with the suction member, expansion means such as a pumping device which may be placed in fluid communication with the expansion chamber and also be capable of the addition of fluid to the chamber, the fluid when added causing the flexible membrane wall of the suction member to expand outward. It should be noted that the hydraulic system common to most remotely operated vehicles can easily supply the pressurized fluid necessary to operate the suction device of the present invention, whereas specialized suction pumps must be added to an R.O.V. to operate normal suction devices.

These and other features, objects and advantages of the present invention will become apparent from the following detailed description, wherein reference is made to the figure in the accompanying drawings.

BRIEF DESCRIPTION OF THE DRAWINGS

FIG. 7 shows a schematic representation of an alternative embodiment of the present invention, wherein the suction member is formed from a flexible rubber-like material.

FIG. 8 shows a schematic representation taken along lines 8—8 of FIG. 7 of the bottom view of the suction member.

DESCRIPTION OF THE PREFERRED EMBODIMENT

Figure 1:
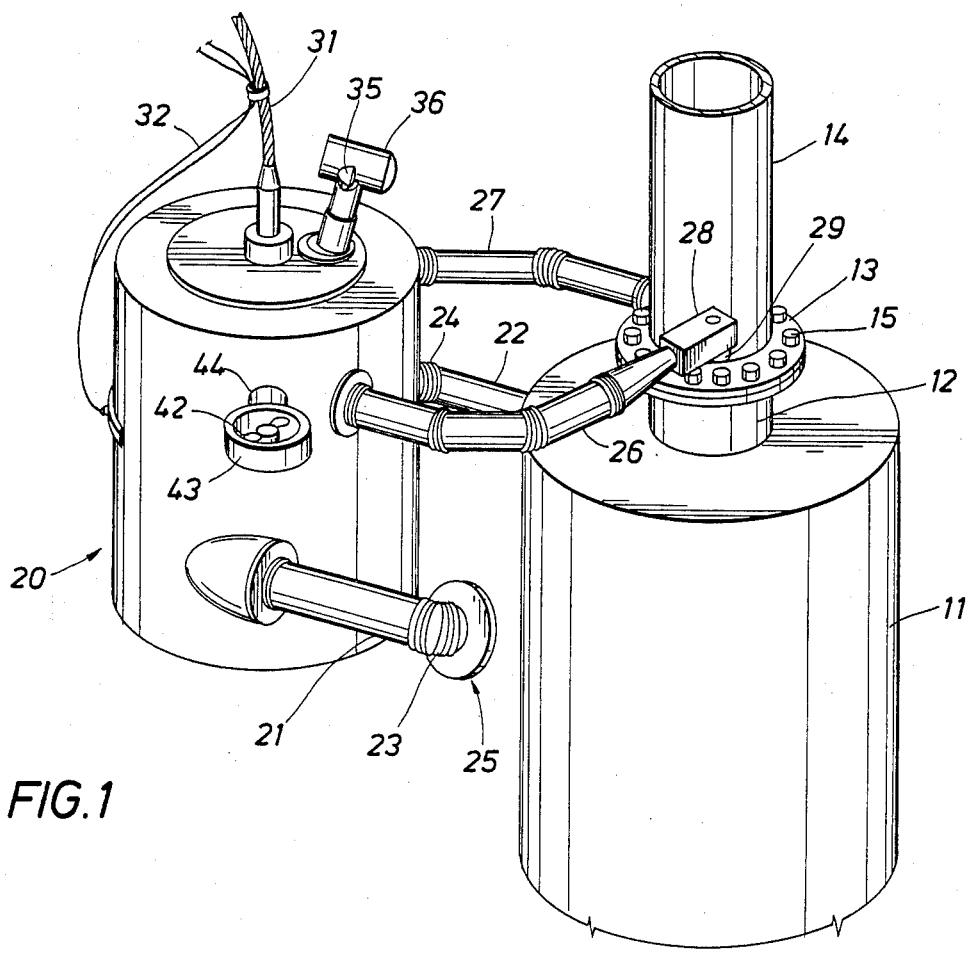
FIG. 1 is an isometric view illustrating a remotely operated vehicle about to engage the manipulator apparatus of the present invention to the smooth outer walls of an underwater cylindrical structure.

Referring now to FIG. 1 of the drawing, an underwater wellhead installation is shown in the form of a large diameter cylindrical structure 11, for example, a tank, footing of a bridge or offshore platform, etc., and having a flanged opening 12 at the upper end thereof to which the lower flanged end 13 of a tubular member 14, such as a pipe or leg, is fixedly secured by means of bolts 15.

Positioned adjacent the underwater cylindrical structure is a remotely operated vehicle 20, (hereinafter R.O.V.). The R.O.V. 20 is provided with at least one support or connector device or arm for securing the manipulator device to the underwater installation 11. As shown in FIG. 1 of the drawing, the connector apparatus may take the form of a pair of articulated arms 21 and 22 having one or more flexible joints 23 and 24. It is to be understood that while articulated arms 21, 22 are preferred, the connector means may merely comprise one or more single rigid arms or support members.

Each of the arms 21, 22 is provided at its outer end with suitable suction means in the form of a manipulator apparatus 25, one form of which will be described in more detail with regard to FIG. 2 hereinbelow. The articulated arms 21, 22 may be selectively actuated to move in any desired and possible position.

In addition to the connector arms 21 and 22, the R.O.V. 20 is provided with one or more outwardly-extendible and movable work-engaging arms 26 and 27, which may be articulated as illustrated. A suitable instrument, tool or work-engaging device, such as a mechanically-operated power wrench 28 having a socket head 29 thereon, is mounted for operation at the end of at least one of the arms 26, 27.

A cable 31 is secured to the top of the R.O.V. 20 for lowering the R.O.V. through the water and/or supplying power thereto. Electric power or hydraulic fluid may be transmitted through a separate conduit or conduits 32 into the R.O.V. 20 for energizing the various elements of the R.O.V. 20. The prime mover apparatus, which may be of any suitable type employed to move, extend and retract or position the various arms 21, 22, 26 and 27 with respect to the body member of the R.O.V. 20 or with respect to each other, is contained within the R.O.V. 20, while the circuitry employed to energize and actuate selectively the various elements may be contained in the R.O.V. 20, or in a controller at an operation base above the surface of the water, or split between the two locations.

To aid in operations being carried out by the R.O.V. 20, the R.O.V. 20 is provided with one or more swivel-mounted flood lights 35 and one or more television cameras 36, for lighting the area in the vicinity of the underwater installation and observing operations, respectively.

The R.O.V. 20 may be provided with one or more propellers 42 mounted in an open-sided housing 43 which in turn is rotatably mounted on a shaft or arm 44 and remotely positionable by signal transmitted from the surface through cable 31. The propellers 42 may be driven by uni-directional or reversible motors (not shown). While the R.O.V. 20 is shown as being provided with motor driven propellers 42, it is to be understood that any suitable type of propulsion means may be employed for moving the R.O.V. 20 through the water.

With the R.O.V. 20 positioned adjacent the underwater installation 11, the R.O.V. 20 may be moved toward the cylindrical structure 11 so that the manipulator apparatus 25 of the R.O.V. 20 which is operatively engaged to the R.O.V. 20 may be positioned substantially flush against the outer surface of the cylindrical structure 11. Pressurized fluid then would be applied to the manipulator apparatus 25 so as to secure the R.O.V. 20 to the cylindrical structure 11, as explained below. It should be understood that the apparatus 25 may be positioned by divers (not shown), or lowered by means of a cable to the structure 11, and used to attach other devices other than the R.O.V. 20 to the structure 11.

Figure 2:
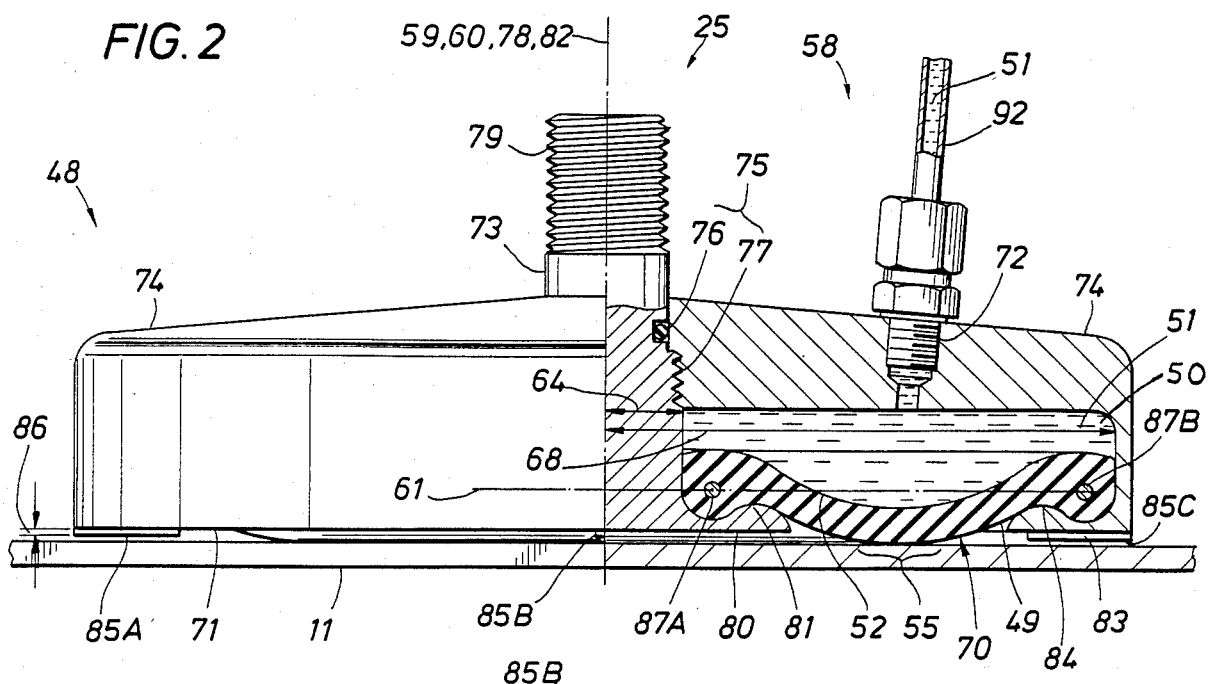
FIG. 2 shows a schematic representation of a side view in partial cross section of a suction member in a preferred embodiment of the present invention.
Figure 3:
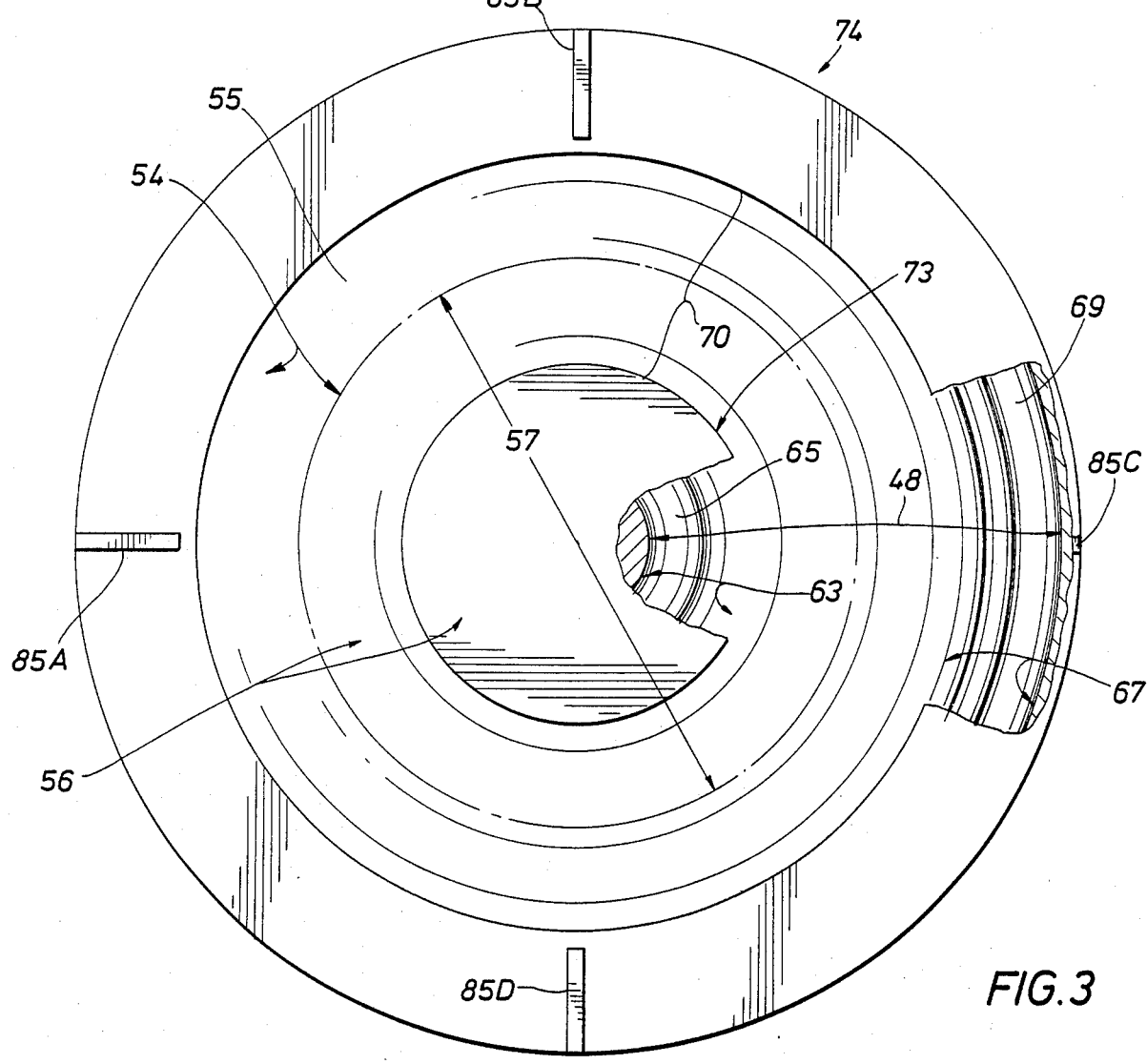
FIG. 3 shows a schematic representation of a bottom view of the suction member shown in FIG. 2.

Referring now to FIGS. 2 and 3 which are the side and bottom views of a preferred embodiment of the present invention, a suction member 48 which may be operatively engaged to the remotely operated vehicle 20 is shown having a rubber-like flexible membrane wall 49 and at least one expansion chamber 50 containing fluid 51 defined in its interior. It is well understood that whereas only one suction member 48 may be required to secure the vehicle 20 to the structure 11 a plurality of suction members 48 may be used in any shaped array to supply enough suction force to secure the vehicle 20 to the structure 11. It is also well recognized that the fluid used for the operation of this apparatus may comprise any fluid well known to the art used for pressurization purposes, such as hydraulic fluid or seawater.

As can be seen in these figures, the flexible membrane wall 49 forms a portion of the sides 52 of the expansion chamber 50. In FIG. 2 the membrane wall 49 forms the lower side 52 of the expansion chamber 50, whereas in FIG. 5 the flexible membrane wall 49 forms the entire side 52A of the expansion chamber 50B. It is also well recognized that whereas only one expansion chamber 50 is shown formed within the interior of suction member 48, a plurality of expansion chambers 50 may be used within any number of suction members 48.

The membrane wall 49 in FIGS. 2 and 3 is shown expanded outward by the addition of fluid 51 to the expansion chamber 50, the membrane wall 49 being expanded a sufficient distance to contact and form a seal 54 (FIG. 3) having a particular sealing surface 55 with the object 11 to be manipulated. Whereas in FIG. 3 the sealing surface 55 is formed in the shape of a circle due to the circular construction of the suction member 48, it is well recognized that the sealing surface 55 may take any shape as long as that shape properly defines a suction cavity 56 beneath the suction member 48. The suction cavity 56 which is capable of exerting a suction grip on the object 11 is shown defined between the suction member 48 and the object 11. The suction cavity 56 is shown with a particular suction cavity diameter 57.

Again it should be noted that the suction cavity 56 is formed not by removal of fluid 51 from chamber 50, but by the addition of fluid 51 to an expansion chamber 50.

Expansion means 58 such as a pressurized hydraulic fluid 51 hydraulic supply system well known to the art is shown placed in fluid communication with and is capable of adding fluid 51 to the expansion chamber 50. The fluid 51 when added to the chamber 50 causes the flexible membrane wall 49 of the suction member 48 to expand outward. It is well recognized that the operability of the suction member 48 depends on the outward expansion of a flexible membrane wall 49, and the subsequent contact of a lower portion of the wall 49 with the object 11. The actual structure which supports the membrane wall 49 need not necessarily be of metallic construction as shown for example in FIGS. 2 and 3. It is well recognized that the support structure may consist of a rubber-like material similar to the flexible membrane wall 49. In other words, the suction member 48 may consist of a relatively resilient flexible pad having an array of expansion chambers 50 formed within the pad.

In a preferred embodiment the suction member 48 has a central longitudinal axis 59 wherein the expansion chamber 50 is defined within the suction member 48 in the shape of the toroid having a central axis of rotation 60 coaxial with the central longitudinal axis 59 of the suction member 48. It is well recognized that many other geometrically shaped expansion chambers 50 may be used to accomplish the same mechanical results of the apparatus shown in FIGS. 2 and 3.

More specifically in a preferred embodiment the flexible membrane wall 49 forms the lower side 52 of a toroid shaped expansion chamber 50. The flexible membrane wall 49 is shown located in a plane 61 which is defined perpendicular to the central longitudinal axis 59 of the suction member 48.

The flexible membrane wall 49 has an inner circular edge 63 (FIG. 3) located adjacent the inner diameter 64 of the expansion chamber 50. The inner edge 63 forms an inner circular seal 65 having a sealing surface formed with the inner elements of the suction member 48 to form an inner seal for the flexible membrane wall 49. Correspondingly, an outer circular edge 67 (FIG. 3) is located adjacent the outer diameter 68 of the expansion chamber 50 and forms an outer circular seal 69 having a sealing surface formed with outer elements of the suction member 48 to form an outer seal for the flexible membrane wall 49. It is well recognized that many other sealing systems may be used to accomplish the same mechanical results.

The lower portion of the flexible membrane wall 49 is shown expanded outward through an annular-shaped flexible membrane wall opening 70 which is defined through the bottom 71 of the suction member 48 a sufficient distance to contact and form seal 54 having sealing surface 55 with the object 11 to be manipulated. The amount of extension of the membrane wall 49 through opening 70 will of course depend upon consideration of engineering design criteria such as the pressure of the hydraulic system, and the particular resiliency of the material forming the flexible membrane wall 49.

Expansion means 58 such as a pressurized fluid 51 hydraulic system well known to the art with its associated tubing and hydraulic connections pass through an opening 72 defined through the suction member 48 in order to place the expansion means 58 in fluid communication with the expansion chamber 50.

The suction member 48 can be seen to include a central hub 73 and an outer drum 74, the central hub 73 being operatively connected in a fluid tight manner to the outer drum 74 by seal and connection means 75, such as a combination of O-ring 76 and thread 77 well known to the art. The seal and connection means 75 typically may have a first and a second portion one of the portions carried by the central hub 73 the other of the portions carried by the outer drum 74, both portions cooperating with one another in order to form the fluid-tight and mechanically sound junction of the two members 73, 74. The O-ring 76 is necessary to prevent escape of the fluid 51 from the expansion chamber 50.

The central hub 73 has a central longitudinal axis 78 which is located coaxial with the central longitudinal axis 59 of the suction member 48. The central hub 73 has engagement means 79 such as a threaded shaft well known to the art located at the upper end thereof for operatively engaging the suction member 48 to the remotely operated vehicle 20 (FIG. 1) or any other device used to transport the apparatus 25. It is well recognized that many different devices may be used to connect the suction member 48 to the remotely operated vehicle 20. The central hub 73 has an outwardly extending shoulder 80 defined at the lower end of the hub 73 which forms a bead 81 beneath the inner circular edge 63 (FIG. 3) of the flexible membrane wall 49. This bead 81 supports and by its cooperation with the membrane wall 49 forms a pressure tight seal with the membrane wall 49.

The outer drum 74 has a central longitudinal axis 82 also located coaxial with the central longitudinal axis 59 of the suction member 48. The outer drum 74 has an inwardly extending shoulder 83 at the lower end thereof forming a bead 84 beneath the outer circular edge 67 (FIG. 3) of the flexible membrane wall 49 which provides a pressure tight seal of the membrane wall 49 with the outer drum 74. The inwardly extending shoulder 83 is located in a plane (not shown for clarity) common to the outwardly extending shoulder 80 of the central hub 73, in order to properly align the edges 63, 67 of the membrane wall 49 with each other. The outer drum 74 has the opening 72 defined through the upper portion thereof to allow passage of expansion means 58 therethrough. It is well recognized that the expansion means 58 may be placed in fluid communication with the expansion chamber 50 by any other means well known to the art.

The outer drum 74 can also be seen to further include bottom spacer means 85A-D which are carried on the bottom 71 of the outer drum 74. The spacer means 85A-D such as sections of metal attached to or machined from the bottom 71 of the suction member 48 are fabricated and/or installed to have a selected height 86 in order to locate the outer drum 74 the selected height 86 away from the object 11 to be manipulated in order to allow the body of water to flow under the suction member 48. The selected height 86 is less than the distance that the flexible membrane wall 49 may be expanded outward through the flexible membrane wall opening 70. In operation, the bottom spacer means 85A-D hold the suction member 48 a particular standoff distance away from the object 11 in order to allow water to flow freely to or from the suction cavity as it is formed or deleted beneath the suction member 48 to assure release of suction.

The flexible membrane wall 49 may also be seen to include for stiffening and orientation purposes two circular reinforcing rings 87A, B shown in cross-section in FIG. 2. The rings 87A, B which are formed in the inner and outer edges 63, 67 of the membrane wall 49 enhance the sealing and dimensional stability characteristics of the membrane wall 49.

Figure 4:
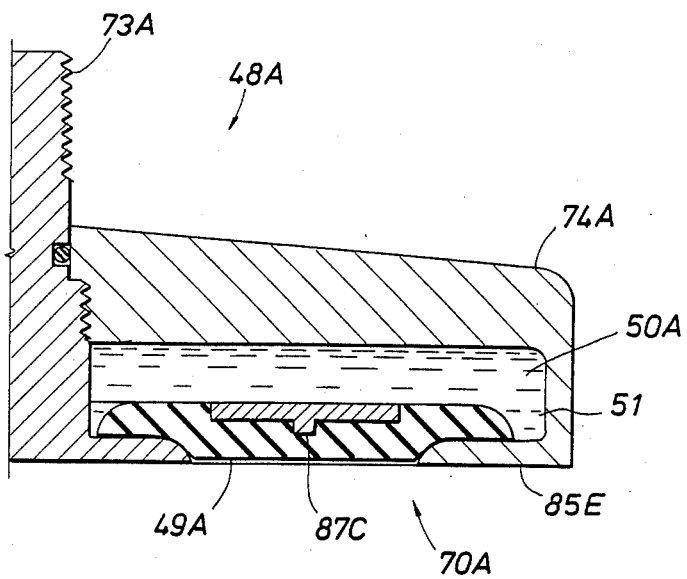
FIG. 4 shows a schematic representation of a half side view in cross section of an alternative embodiment of the flexible membrane wall of the present invention.

Referring now to FIG. 4 in an alternative embodiment the flexible membrane wall 49A positioned within a flexible membrane wall opening 70A may not incorporate reinforcing rings 87A, B but instead may incorporate one reinforcing ring 87C shown located in the central span of the membrane wall 49A and sized so as to hinder passage of the wall 49A through opening 70. It is well recognized that the suction member 48A may again have a center hub 73A and an outer drum 74A having expansion chamber 50A containing fluid 51 with a bottom support means 85E of a similar design to that of the apparatus shown in FIGS. 2 and 3. It is well recognized that different membrane walls 49, (49A) may be inserted within the same suction member 48, (48A) in order to provide optimum suction cavity formation upon different objects 11 encountered in the body of water.

Figure 5:
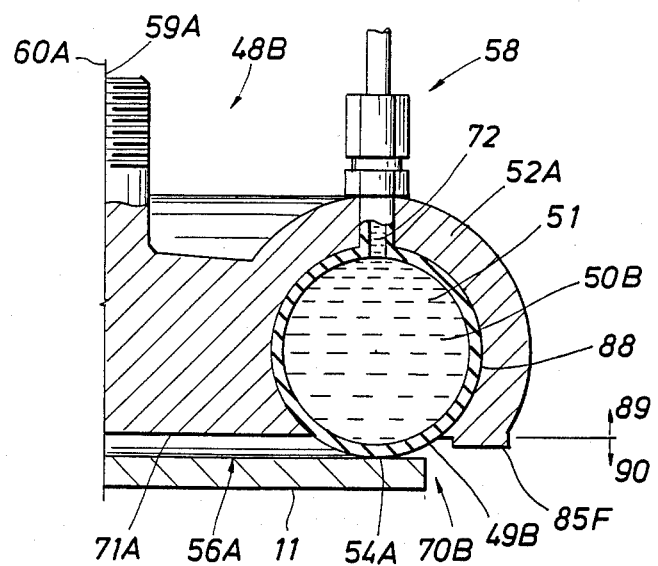
FIG. 5 shows a schematic representation of a half view of an alternative embodiment of the suction member and flexible membrane wall.

Referring now to FIG. 5 in an alternative embodiment of the present invention the flexible membrane wall 49B may be shaped so as to form the entire sides of a toroid shaped expansion chamber 50B. In simplest terms, an inner tube well known to the art may be used to form the flexible membrane wall 49B, the fluid 51 located within the tube filling the expansion chamber 50B. An upper portion 89 of the flexible membrane wall 49B may be contained within an expansion cavity 88 defined within the suction member 48B, a lower portion 90 of the flexible membrane wall 49B being expanded outward through an annular shaped flexible membrane wall opening 70B which is defined through the bottom 71A of the suction member 48B a sufficient distance to contact and form a seal 54A having a sealing surface with the object 11 to be manipulated. The expansion means 58 passes through an opening 72 which is defined through the suction member 48B and the flexible membrane wall 49B to place the expansion means 58 in fluid communication with expansion chamber 50B. As noted before a bottom spacer means 85F may be incorporated to allow fluid to flow freely beneath the suction member 48B prior to the outward extension of the membrane wall 49B.

Figure 6:
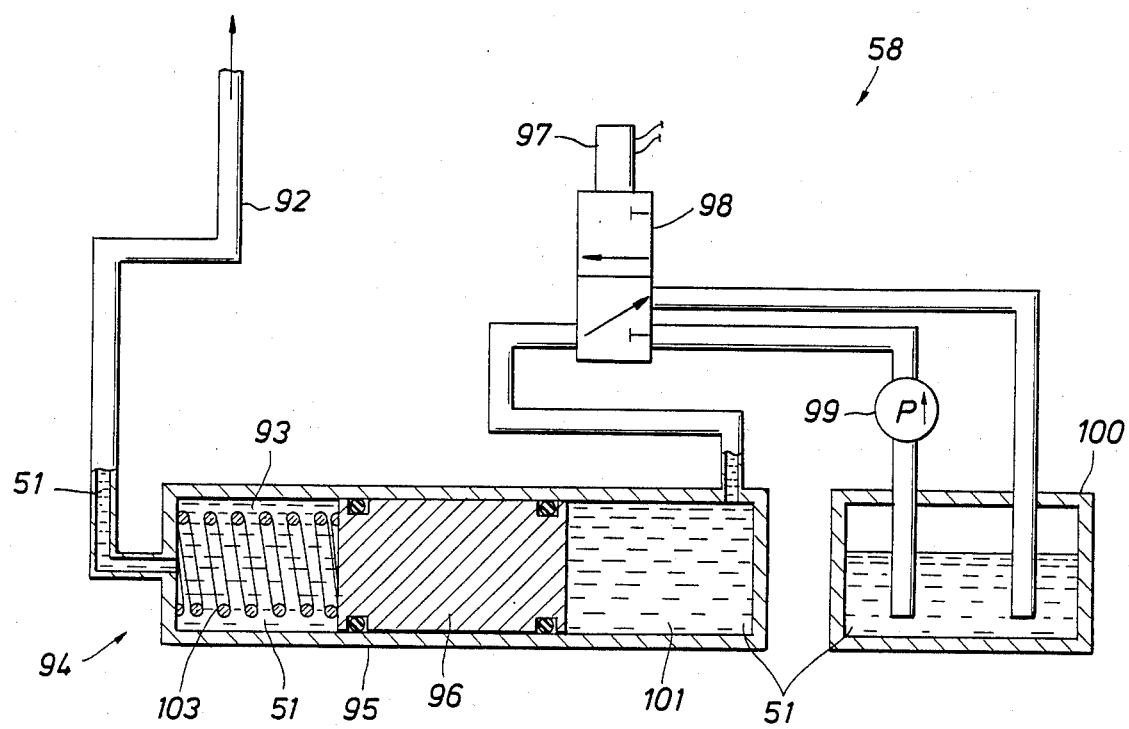
FIG. 6 shows a schematic representation of the expansion means of the present invention.

Referring now to FIG. 6 and for reference purposes FIGS. 2 and 3 the expansion means 58 can be seen to further include a main hydraulic circuit 92 formed outside the suction member 48 and passing through the opening 72 which is defined through the suction member 48 into the expansion chamber 50. The expansion means 58 can be seen to include a pressurization chamber 93 formed within the cylinder means 94 which typically has a housing 95 and a moveable piston 96. The pressurization chamber 93 is placed in fluid 51 communication with the main hydraulic circuit 92 in order to supply fluid 51 to and to receive fluid 51 from the expansion chamber 50. The pressurization chamber 93, main hydraulic circuit 92, and the expansion chamber 50 remain isolated from the body of water to limit loss of hydraulic fluid in the event of rupture.

In operation, to pump fluid 51 from the pressurization chamber 93 to the main hydraulic circuit 92 solenoid 97 of valve means 98 is actuated along with pump 99 which draws fluid 51 from reservoir 100 and supplies it to the pressure chamber 101. Addition of fluid 51 to pressure chamber 101 drives the moveable piston 96 against spring 103 which causes fluid 51 to be forced from the pressurization chamber 93 to the expansion chamber 50. Fluid 51 added to the chamber 50 forces the flexible membrane 49 outward into contact with object 11, and a seal 54 is formed. Additional fluid 51 added to the chamber 50 forces the suction member 48 away from the object 11 and a suction is created in suction cavity 56, which allows suction member 48 to grip and manipulate object 11 if desired. In this manner suction member 48 may be used to attach one device such as R.O.V. 20 to object 11, or move object 11 from one location to another.

If power is lost to the expansion means 58 solenoid 97 deenergizes and valve means 98 allows fluid 51 in pressure chamber 101 to return to reservoir 100. Spring 103 thereafter drives piston 96 within housing 95 so as to cause fluid 51 to be removed from expansion chamber 50 and returned to pressurization chamber 93. In this manner, upon loss of power or by operator command, the flexible membrane wall 49 is retracted from object 11, the suction cavity 56 is deleted from beneath the suction member 48, and the suction member 48 no longer grips object 11. In this manner remotely operated vehicle 20 will become automatically detached from object 11 upon loss of power to the expansion means 58 or by operator command.

Referring now to FIGS. 7 and 8 in an alternative embodiment of the present invention, a suction member 48C is shown having a rubber-like flexible membrane wall 49C and an expansion chamber 50C containing fluid 51 defined in the interior of the suction member 48C. As can be seen, the flexible membrane wall 49C forms the entire portion of the sides of the expansion chamber 50C. The membrane wall 49C is expanded outward as before by the addition of the fluid 51 to the expansion chamber 50C a sufficient distance to contact and form a seal 54B having a sealing surface 55A with the object 11 to be manipulated. After the seal 54B is defined the addition of additional fluid 51 to the expansion chamber 50C causes the formation of suction cavity 56B capable of exerting a suction grip on the object 11 as the engagement means 79A are forced further away from the object 11 by the addition of additional fluid 51.

As before expansion means 58 are shown placed in fluid communication with the expansion chamber 50C. In this alternative embodiment of the present invention, the entire suction member 48C is formed from a flexible rubber-like material, with the exception of the engagement means 79A which form a backing plate for the rubber-like material. The rubber-like material may be attached to the engagement means by for example a rubber bonding process well known to the art. It should be recognized that whereas only one suction member 48C has been shown formed from the rubber-like material, an entire array of suction members 48C may be defined in a common sheet of flexible rubber-like material. In this manner, a common sheet of rubber-like material may be formed to generate a plurality of suction cavities 56B when the sheet is contacted to the object 11 and the respective expansion chambers 50C are filled with fluid 51. In this manner a single sheet of rubber-like material may be capable of gripping an object 11 at several different points upon the object 11 thereby insuring the manipulation of that object 11.

Many other variations and modifications may be made in the apparatus and techniques hereinbefore described by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. Manipulator apparatus for use in manipulating submerged objects located in a body of water, said manipulator apparatus comprising:

at least one suction member having a rubber-like flexible membrane wall and at least one expansion chamber containing fluid defined in the interior of said at least one suction member thereof, said flexible membrane wall forming a portion of the sides of said at least one expansion chamber, said membrane wall expanded outward away from the interior of said suction member by the addition of fluid to said at least one expansion chamber a sufficient distance to contact and form a seal having a sealing surface with said object to be manipulated, whereby at least one suction cavity capable of exerting a suction grip of said object is defined between said at least one suction member and said object, and expansion means placed in fluid communication with and being capable of addition of said fluid to said at least one expansion chamber, said fluid when added causing said flexible membrane wall of said at least one suction member to expand outward away from the interior of said suction member.

2. The apparatus of claim 1 wherein said at least one suction member has a central longitudinal axis defined therethrough, and wherein one expansion chamber is defined within said at least one suction member in the shape of a toroid having a central axis of rotation coaxial with said central longitudinal axis of said at least one suction member.

3. The apparatus of claim 2 wherein said flexible membrane wall forms the sides of said toroid-shaped expansion chamber, an upper portion of said flexible membrane wall being contained within said at least one suction member, a lower portion of said flexible membrane wall expanded outward away from the interior of said suction member through an annular-shaped flexible membrane wall opening defined through the bottom of said at least one suction member a sufficient distance to contact and form said seal having said sealing surface with said object to be manipulated, and wherein said expansion means pass through an opening defined through said at least one suction member and said flexible membrane wall to place said expansion means in fluid communication with said expansion chamber.

4. The apparatus of claim 2 wherein said flexible membrane wall forms the lower side of said toroid-shaped expansion chamber, said flexible membrane wall located in a plane defined perpendicular to said central longitudinal axis of said at least one suction member, said flexible membrane wall having an inner circular edge located adjacent the inner diameter of said expansion chamber and forming an inner circular seal having a sealing surface thereon, and an outer circular edge located adjacent the outer diameter of said expansion chamber and forming an outer circular seal having a sealing surface thereon, a portion of said flexible membrane wall expanded outward away from the interior of said suction member through an annular-shaped flexible membrane wall opening defined through the bottom of said at least one suction member a sufficient distance to contact and form said seal having said sealing surface with said object to be manipulated, and wherein said expansion means pass through an opening defined through said at least one suction member to place said expansion means in fluid communication with said expansion chamber.

5. The apparatus of claim 4 wherein said at least one suction member includes a central hub and an outer drum, said central hub operatively connected in a fluid-tight manner to said outer drum by seal and connection means having a first and a second portion, one of said portions carried by said central hub, the other of said portions carried by said outer drum, said central hub having a central longitudinal axis located coaxial with said central longitudinal axis of said at least one suction member, and having engagement means located at the upper end thereof for operatively engaging said suction member to said remotely operated vehicle, and having an outwardly-extending shoulder at the lower end thereof forming a bead beneath said inner circular edge of said flexible membrane wall, said outer drum having a central longitudinal axis located coaxial with said central longitudinal axis of said at least one suction member, and having an inwardly-extending shoulder at the lower end thereof forming a bead beneath said outer circular edge of said flexible membrane wall, said inwardly-extending shoulder located in a plane common to said outwardly-extending shoulder of said central hub, said outer drum having said opening defined through the upper portion thereof to allow passage of said expansion means therethrough.

6. The apparatus of claim 5 wherein said outer drum further includes bottom spacer means carried on the bottom of said outer drum having a selected height to locate said outer drum said selected height away from said object to be manipulated and to allow said body of water to flow under said at least one suction member, said selected height being less than the distance that said flexible membrane wall may be expanded outward away from the interior of said suction member through said flexible membrane wall opening.

7. The apparatus of claim 1 wherein said expansion means further includes a main hydraulic circuit formed outside said at least one suction member and passing through an opening defined through a portion of said at least one suction member into said at least one expansion chamber.

8. The apparatus of claim 7 wherein said expansion means further includes a pressurization chamber formed within cylinder means, said cylinder means having a housing and a moveable piston at one end thereof, said pressurization chamber placed in fluid communication with said main hydraulic circuit for supplying fluid to and receiving fluid from said at least one expansion chamber defined within said at least one suction member.

9. The apparatus of claim 8 wherein said pressurization chamber, main hydraulic circuit, and said at least one expansion chamber remain isolated from said body of water.

10. Manipulator apparatus adapted to be used in manipulating submerged objects located in a body of water, said manipulator apparatus comprising;

at least one suction member having a rubber-like flexible membrane wall and at least one expansion chamber capable of containing fluid defined in the interior thereof, said flexible membrane wall defining a portion of the sides of said at least one expansion chamber, said membrane wall capable of expansion outward away from the interior of said suction member by the addition of fluid to said at least one expansion chamber a sufficient distance to contact and form a seal having a sealing surface with said object to be manipulated, whereby at least one suction cavity capable of exerting a suction grip on said object is defineable between said at least one suction member and said object, and expansion means placeable in fluid communication with and being capable of addition of said fluid to said at least one expansion chamber, said fluid when added causing said flexible membrane wall of said at least one suction member to expand outward away from the interior of said suction member.

* * * * *